United States Patent [19]

Fleischer et al.

[11] 4,101,149
[45] Jul. 18, 1978

[54] COUPLING DEVICE

[76] Inventors: Henry Fleischer, 18 Notch Park Rd., Little Falls, N.J. 07424

[21] Appl. No.: 658,581

[22] Filed: Feb. 17, 1976

Related U.S. Application Data

[63] Continuation-in-part of Ser. No. 479,667, Jun. 17, 1974, abandoned.

[51] Int. Cl.² .............................................. F16L 21/00
[52] U.S. Cl. ...................................... 285/55; 285/320; 285/332.2
[58] Field of Search ...................... 285/15, 16, 17, 319, 285/320, 332.3, 332.2, 303, 334.4, 332, 7, 386, 55, 280, 291; 403/105, 107

[56] References Cited

U.S. PATENT DOCUMENTS

| | | | |
|---|---|---|---|
| 290,446 | 12/1883 | McConnell | 285/332.3 |
| 724,390 | 3/1903 | Hirschell | 285/332.3 X |
| 940,678 | 11/1909 | Doane et al. | 285/319 X |
| 1,509,562 | 9/1924 | Macgregar | 285/280 |
| 1,642,745 | 9/1927 | Pearce et al. | 285/332.3 X |
| 2,925,289 | 2/1960 | Brown, Jr. et al. | 285/7 |
| 3,246,671 | 4/1966 | Stein et al. | 285/291 X |
| 3,280,526 | 10/1966 | Pepitone | 285/319 X |
| 3,307,860 | 3/1967 | Blount et al. | 285/55 |
| 3,338,598 | 8/1967 | Kurtz | 285/55 |
| 3,633,942 | 1/1972 | Meyerhoefer | 285/332 X |

FOREIGN PATENT DOCUMENTS

| | | | |
|---|---|---|---|
| 103,326 | 12/1965 | Denmark | 285/334.4 |
| 487,564 | 6/1938 | United Kingdom | 285/332.3 |
| 973,989 | 11/1964 | United Kingdom | 285/332 |

Primary Examiner—Thomas F. Callaghan

[57] ABSTRACT

An adjustable coupling device is provided which can be secured to each of two sections of conduit, such as two hoses or pipes, by hand, without the need for employing tools. The coupling device comprises a socket member and a plug member which are adapted to be adjustably positioned with respect to each other as one or both members wear, said plug member being adapted to be removably and adjustably disposed in said socket member. The above plug member includes interior walls which define a bore, and securing means, such as teeth or recessed portions. The socket member comprises a body portion having a bore running therethrough defined by the interior walls thereof, which bore is adapted to receive said plug member in a manner such that the bore of said plug member is in communication with the bore of said socket member, and at least one connecting member attached to said socket member and adapted to engage said securing means of said plug member.

14 Claims, 8 Drawing Figures

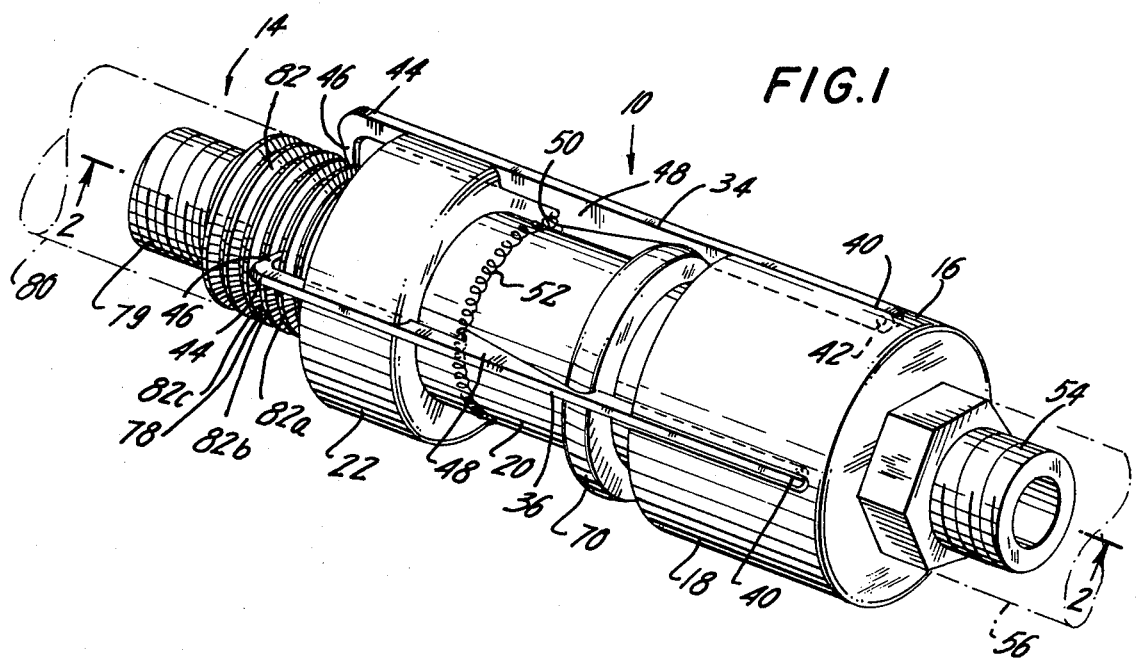
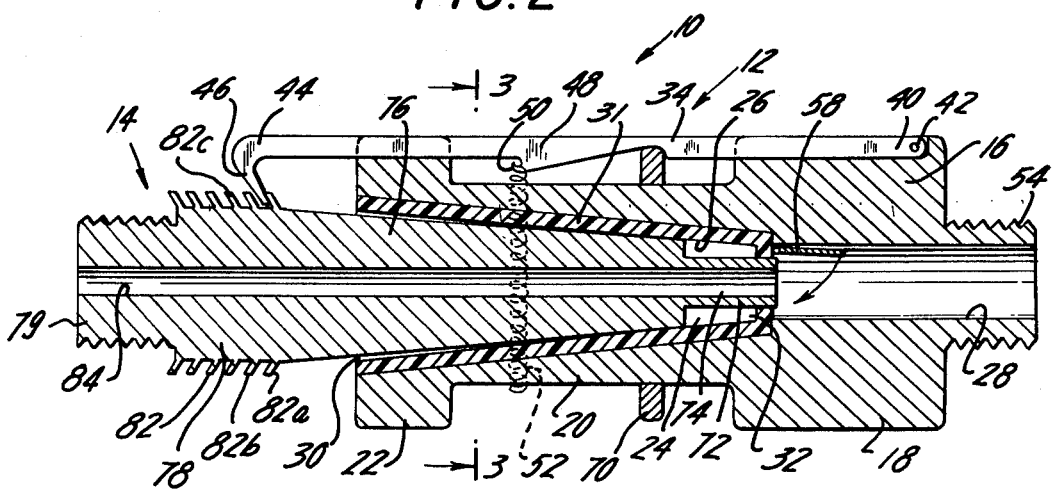
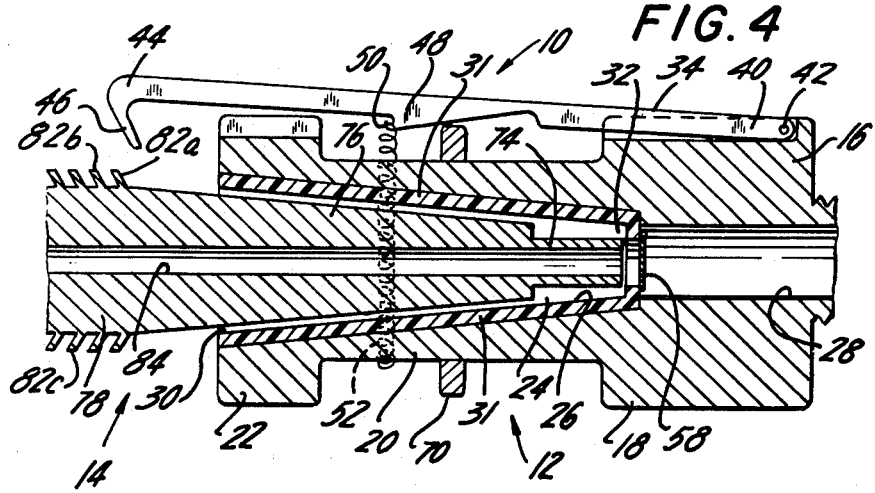
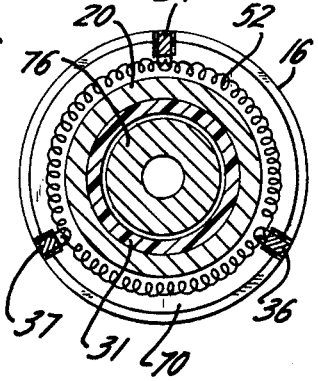

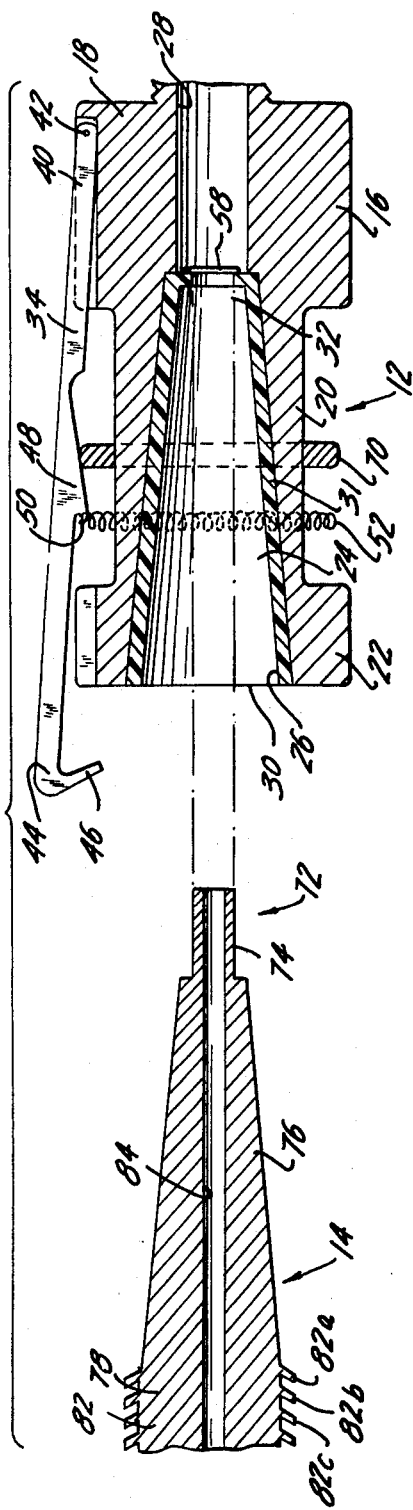
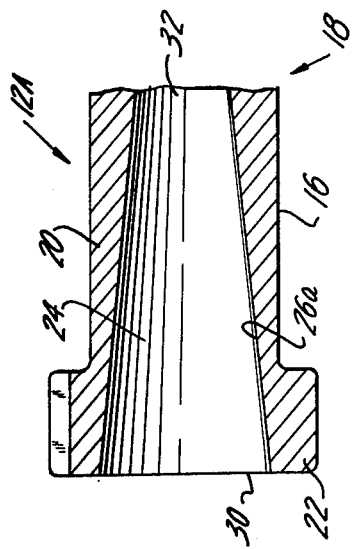
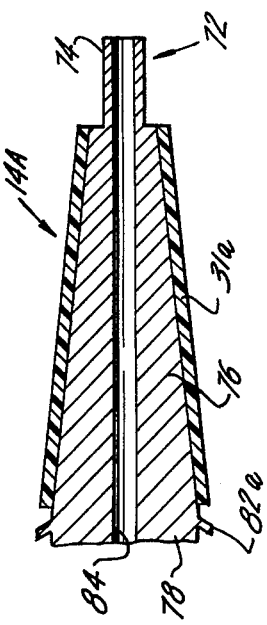
FIG.5
FIG.5B
FIG.5A

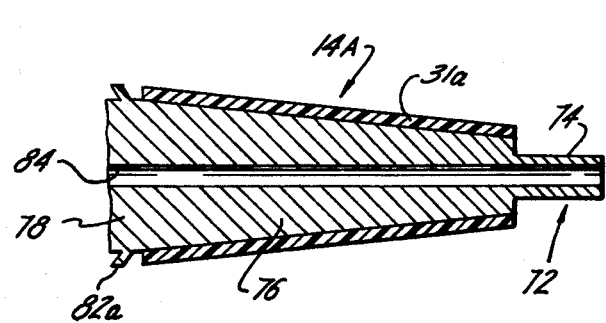
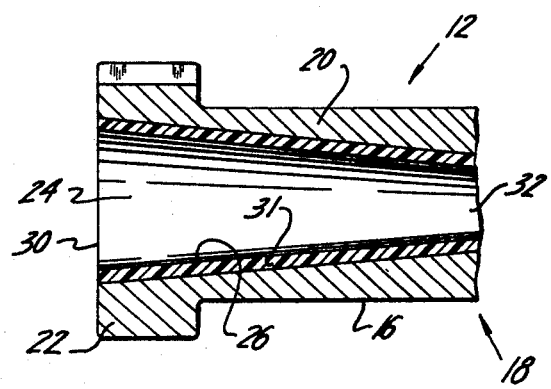
FIG.6

COUPLING DEVICE

REFERENCE TO OTHER APPLICATIONS

This application is a continuation-in-part of application Ser. No. 479,667, filed June 17, 1974, now abandoned, which is a continuation-in-part of application Ser. No. 427,149 filed Dec. 21, 1973, now abandoned.

FIELD OF THE INVENTION

The present invention relates to a coupling device employed for joining two sections of conduit such as two hoses, together in a fluid-tight manner, the coupling device being so designed so that worn components can be repositioned with respect to each other so that unworn portions thereof can be employed to form the fluid-tight joint. The present invention further provides a clamping member which can be employed to connect one part of a two part coupling device, such as described above, to a hose, such connection and/or subsequent disconnection being effected manually without the need for employing tools.

BACKGROUND OF THE INVENTION

Coupling devices for joining two hoses together in a so-called air-tight manner are well known in the art. They are of rather complex construction and include finely machine surfaces which are subject to wear, and generally comprise two pieces, namely, a socket member and a plug member adapted to be seated in the socket member. These members are usually formed of hard steel for increased durability; however when the plug member is repeatedly inserted in or removed from the socket member, after a relatively short period, portions of the plug member and socket member tend to wear. When this occurs, the air-tight seal provided by the coupling device is lost and fluids flowing through the hoses, which are joined together by the coupling device, tend to leak out of the coupling device between the worn surfaces of the plug member and socket member. Eventually, fluid leakage around the worn surfaces of the plug member and socket member becomes so great that it becomes intolerable and the coupling device is rendered useless. When this occurs, the coupling device is removed from the conduits or hoses and a new, expensive, coupling device is employed in its place. The worn coupling device cannot be repaired and is usually discarded.

The above-described coupling devices are usually provided with internal or external threads and a nut for attaching each section of the coupling device to a portion of hose. Normally, attaching of the coupling device to the hoses cannot be accomplished without employing a wrench or other tool. Furthermore, where the coupling device has been worn to a point where it must be replaced, it cannot be removed by hand and must be removed with a wrench or other tool. This can indeed be a time consuming task especially where the coupling device is not readily accessible and/or tools are not readily available.

Conventional coupling devices as described above are usually formed of hard steel and therefore are thought to be relatively tough and durable. Accordingly, they are usually carelessly handled and frequently abused and dropped on hard surfaces, such as concrete floors. Notwithstanding the fact that these coupling devices appear to have impact resistant surface, the jolt received is often severe enough to cause the coupling device to break or mal-function.

In accordance with the present invention, an adjustable coupling device is provided which is of simple design and the components thereof are adapted to be adjustably disposed with respect to each other so that when one or more components wear, they can be repositioned with respect to each other to continue to provide a substantially fluid-tight seal or joint. Furthermore, the coupling device of the invention can be provided with unique clamping members which allow attachment of the components of the coupling device to conduit sections, such as to two hoses, by hand, without the need for employing wrenches or other tools. Furthermore, the coupling device of the invention as well as the unique clamping members may include a protective cover or sleeve which protects these devices from impact received upon dropping the same on hard surfaces.

BRIEF STATEMENT OF THE INVENTION

In accordance with the present invention, an adjustable coupling device is provided comprising a socket member and a plug member adapted to be removably and adjustably disposed in the socket member so that walls of the plug member and socket member contact each other to form a substantially fluid-tight seal. When portions of the plug member and socket member wear, the plug member can be repositioned in the socket member so as to continue to form a fluid-tight seal with the socket member. The plug member includes interior walls which define a bore which runs from end to end of said plug member. The plug member also includes securing means which are employed in connecting the plug member to the socket member as will be described hereinafter. The socket member comprises a body portion having a bore running therethrough defined by the interior walls of the socket member, which bore is adapted to receive the plug member in a manner such that at least a portion of the outer surface of the plug member contacts the walls defining the inner bore of the socket member and the bores of the plug member and socket member are in communication with each other. The socket member also includes at least one connecting member attached thereto and adapted to engage at least one of the securing means of the plug member when the plug member is disposed in the socket member.

In preferred embodiments of the invention, the bore of the socket member and/or the outer walls of the plug member may include a lining material, which preferably is wear-resistant as described below; in such embodiments, when portions of the lining material disposed in the bore of the socket member wear and/or when portions of the lining material disposed on the outer walls of the plug member wear, the plug member can be repositioned with respect to the socket member so that a substantially fluid-tight seal will continue to be maintained.

In a preferred embodiment of the invention, the plug member comprises a first tubular end segment, an intermediate segment, the narrow end of which is connected to the tubular end segment, and a second end segment connected to the wider end segment of the conical-like member, the inner bore of the plug member running through each of said first end, intermediate and second end segments of the plug member. The socket member comprises a body portion including first and second end portions and an intermediate portion. The interior walls of the body portion define a bore comprising a tapered passage, the wide segment of which extends from the first end portion into the intermediate portion. The first tubular end segment and the intermediate segment of the plug member are adapted to seat in the tapered passage of the socket member with at least a portion of the outer surface of the plug member in contact with a portion of the interior walls of the socket member.

The tapered passage of the socket member and/or the outer surface of the plug member preferably includes a wear-resistant lining material. The wear-resistant lining material may comprise a metal, such as steel, hard rubber, plastic, leather or other material adaptable for gaskets, and is designed to present a wear resistant surface to the plug and/or socket members, which surface is designed to wear faster than such members. As will be apparent to one skilled in the art, the plug member will be constantly inserted and removed from the socket member and this will cause wear on the plug member including the tubular end segment thereof (or lining material if present) and the lining material of the socket member (or inner walls of the socket member if no lining material is present). As the lining material of the plug member and/or socket member wears, the plug member can be inserted deeper into the tapered passage so as to present the wider portion of the intermediate section of the plug member (or lining material thereon if present) to the lining material of the socket member (or walls thereof if no lining material is present). In this manner, even though the lining (or walls) of the socket member, and perhaps the lining or outside surface of the plug member may wear, fluid-tight contact between the plug member and socket member may be still maintained by merely repositioning the plug member in the socket member.

Each of the socket member and plug member will include means for connecting each of these members to a conduit section or hose. For example, each of these members may include a threaded section which is adapted to be engaged with a fitting secured to a hose section.

In another embodiment of the present invention, a clamping member is provided for attaching one part of a two part hose coupling device, such as the socket member or the plug member, to a hose. The clamping member comprises a body section having a bore running therethrough and includes a first end portion, and an intermediate portion and a second end portion, the first end portion being adapted to be connected to one part of the two part coupling device, said one part of the coupling device including a tubular end portion having a bore running therethrough, such as a conventional nipple. The clamping member will also include at least a pair of spaced apart clamping rods, each of which is pivotally connected to the body section of the clamping member, each of said clamping rods including a clamp section connected at one end thereof. An annular ring member is disposed about the body portion of the clamping member in contact with the clamping rods, so that when a hose is inserted in the second end portion of the body section, the annular ring member can be positioned so as to force the connecting rods to be pivoted downwardly so that the clamp sections thereof will be forced against the hose and thereby hold the hose in place in the body portion and in communication with the one part of the coupling device.

BRIEF DESCRIPTION OF THE FIGURES

FIG. 1 is a perspective view of an adjustable coupling device in accordance with the invention;

FIG. 2 is a cross-sectional view of the adjustable coupling device taken along lines 2—2 of FIG. 1;

FIG. 3 is a cross-sectional view of the coupling device shown in FIG. 2 taken along the lines 3—3 thereof;

FIG. 4 is a fragmentary cross-sectional view of the coupling device shown in FIG. 2 where the plug member is not fully seated in the socket member.

FIG. 5 is an exploded view of the coupling device shown in FIG. 2;

FIG. 5A is a fragmentary cross-sectional view of another type of plug member for use in the coupling device of the invention;

FIG. 5B is a fragmentary cross-sectional view of another type of socket member for use in the coupling device of the invention;

FIG. 6 is a fragmentary cross-sectional view of the plug and socket members having lining attached thereto.

DETAILED DESCRIPTION OF THE FIGURES

Referring to the accompanying Figures wherein like parts are represented by like numerals in the several views, in FIGS. 1 to 5 there is shown a coupling device in accordance with the present invention identified generally by the numeral 10. The coupling device 10 includes a socket member generally indicated by the numeral 12 and a plug member generally indicated by the numeral 14. The socket member 12 includes a body portion 16 having a first end portion 18, and intermediate portion 20 and a second end portion 22. The socket member 12 also includes a tapered bore 24 defined by the inner tapered walls 26 and the inner walls 28 of the socket member 12. The bore or tapered passage 24 extends from end to end of the socket member 12 and includes a wide end 30 and a narrow end 32 so that, in effect, the tapered passage forms a truncated cone-like passage. The inner walls of the tapered passage are preferably lined with a wear resistant material 31 such a plastic material, for example, polyethylene or polyurethane, or metal, for example, brass, lead, steel and the like.

The socket member also preferably includes three connecting rods 34, 36 and 37 as shown in FIGS. 1 and 3, which are fitted in slots in the body portion 16 of the socket member 12 in a manner such that at least a portion of the connecting rods will be disposed below the outer surface of the body portion 16 of the socket member 12. In this manner, the connecting rods will not be broken or other wise damaged if the body portion of the socket member 12 is subjected to a heavy blow. Each of the connecting rods comprises a first end portion 40 which is pivotally connected by means of pivot pin 42 to the first end 18 of the body portion 16. The connecting rods will also include a second end portion 44 which includes first attaching means 46 in the form of a hook-like member, the purpose of which will become apparent hereinafter. The intermediate portion 48 of the connecting rods includes attaching means 50. A circular coiled spring is disposed about the body 16 of the socket member and is adapted to engage the second attaching means 50 of the connecting rods so as to hold the connecting rods against the body portion of the socket member, where desired, and to prevent the connecting rods from springing away from the socket member.

The first end 18 of the socket member 12 also includes securing means 54 for use in securing the socket member to an end of a hose section 56 (shown in phantom). Such securing means 54 may comprise an internally threaded or externally threaded section which is adapted to be secured to a fitting attached to the hose section 56.

The socket member 12 also includes an annular ring member 70 which is disposed about the body portion of the socket member beneath the connecting rods 48, as shown. When the ring member 70 is moved towards the second end 22 of the socket member 12, the ring member 70 contacts the connecting rods 48 and causes the connecting rods to pivot upwardly so that the first attaching members or hook-like members 46 become disengaged from the plug member 14, as will be described in detail hereinafter.

The plug member 14 comprises a first end 72 which preferably is in the form of a tubular end segment 74 as shown, an intermediate conical-like segment 76 and a second end segment 78. The second end segment 78 includes hose connecting means 79 for securing the plug member 14 to a hose section, which hose connecting means may take the form of an internally or externally threaded section which is adapted to be secured to a fitting connected to the hose section 80 (shown in phantom).

The second end segment 78 of the plug member 14, that is the segment connected to the conical-like intermediate segment 76, includes a plurality of securing means 82 such as connecting teeth. The connecting teeth 82 extend from the surface of the conical member and are angled backwardly so that they can be engaged by the hook-like attaching means 46 of the connecting rods 48. The teeth 82 are preferably blunted at their ends so as to present a substantially wear resistant surface to the hook-like members 46 of the connecting rods 48.

A bore or passage 84 extends through the plug member 14, that is through each of said first and second end segments and said intermediate segment, as shown.

The plug member 14 is adapted to be seated in the tapered passage 24 of the socket member 12 so that the outer surfaces of the plug member 14 contact the inner walls or lining 31 of the tapered passage 24.

A movable closure member in the form of a disk 58 is hingedly secured to the inner walls 28 of the socket member 12 at the narrow end 32 of the tapered passage. The disk 58 will normally be in its closed position, that is, it will cover the opening at the narrow end 32 of the tapered passage of the socket member 12 when the plug member 14 is not seated in the tapered passage. As will be seen hereinafter, when the plug member 14 is seated in the tapered passage 24, the tubular end segment 74 of the plug member will contact the closure member 58 and cause it to open so as to open the narrow end 32 of the tapered passage and allow flow of fluid from the hose section 56 through the bore 24 of the socket member 12 into the bore 84 of the plug member 14 and thence into the hose section 80. The fluid flowing from the hose section 56 through the bore 54 into the tapered passage 24 will cause the closure member or disk 58 to remain in the open position as shown in FIG. 2.

Referring now to FIGS. 5A and 5B, in FIG. 5A, there is seen a plug member 14A similar to plug member 14 shown in FIGS. 1 to 5 with the exception that plug member 14A includes a wear resistant lining 31a about the intermediate conical-like segment 76. The socket member 12A is similar to socket member 12 shown in FIGS. 1 to 5 with the exception that the socket member 12A does not include a wear resistant lining 31.

It will now be appreciated that the plug member 14A which includes the lining 31a may be employed in conjunction with the socket member 12A which does not include the lining 31. Furthermore, the plug member 14A which includes the lining 31a may be employed in conjunction with the socket member 12 which includes the lining 31 as shown in FIG. 6. However, slight modifications in the width or taper of the plug member 14A and/or the width or taper of the bore 24 of socket member 12A or 12 may be required to accommodate the plug member so that a fluid-tight seal may be maintained between the members, as will be apparent to one skilled in the art.

Thus, after continued use, the lining 31a of the plug member 14A and/or the lining 31 of the socket member 12 (where present) or the inner walls 26a of the socket member 12A may wear. In such case, the plug member 14A may be repositioned, for example, moved deeper into the socket member 12A or socket member 12 so that a fluid tight seal may be effected between the two members.

What is claimed is:

1. A hand adjustable substantially fluid-tight coupling device comprising, in combination, a socket member and a plug member adapted to be removably disposed in said socket member in a first position to form a substantially fluid-tight seal between said members, said plug member comprising a conical-like member including tapered outer walls, and inner walls, said inner walls defining a bore running through said plug member, and at least two securing means, one of said securing means being disposed closer to a narrow end of said tapered outer walls than the other of said securing means, said socket member comprising a body portion including solid rigid outer walls and tapered inner walls defining a tapered passageway running through said body portion, at least one wear resistant lining disposed between said tapered outer walls of said plug member and said tapered passageway of said socket member, said tapered outer walls of said plug member being adapted to seat in in initial portion of said tapered passageway of said socket member, to define said first position and restricted to said initial position when so seated in that it cannot be moved deeper into the socket member, said plug member and socket member by means of said lining forming a substantially fluid-tight seal between said members, and only after portions of said lining have worn, said plug member being adapted to be repositioned by hand, without the need for use of a tool, with respect to said initial portion of said passageway of said socket member to a second portion of said passageway to define a second position and thereby form, by means of said lining, a substantially fluid-tight seal with said socket member, said socket member further including at least one securing means comprising at least one connecting rod, a portion of which is connected to said body portion of said socket member, said connecting rod being adapted to manually engage at least one of said securing means of said plug member when said plug and socket members are in their first position, and after a portion of said lining has worn and said plug member has been repositioned in said socket member to define said second position, a second of said securing means of said plug member and said connected rod of said socket member are adapted to be manually engaged in a second position relative to each other to retain said plug member in said socket member in substantially fluid-tight engagement, said at least two securing means of said plug member being axially spaced from the wide end of said tapered passageway of said socket member when said plug member and said socket member are in the assembled position.

2. The coupling device as defined in claim 1 wherein said plug member includes first and second end portions, and said passageway of said socket member includes first and second end sections, whereby when said plug member and socket member are in said first position, said first end portion of said plug member is spaced from said second end section of said socket member, whereby after portions of said lining have worn, said plug member can be moved deeper into said socket member to said second position.

3. A coupling device as defined in claim 1 wherein said plug member comprises a first tubular end segment tapering outwardly to an intermediate segment and a second end segment, and said socket member comprises said body portion including first and second end portions, and an intermediate portion, said inner walls of said socket member defining a tapered passage running through at least said first end and intermediate portions, the wide end of said tapered passage extending from said first end portion tapering inwardly into said intermediate portion, the first tubular end segment and intermediate segment of said plug member being adapted to seat in said tapered passage of said socket member in said first and second positions to form, by means of said lining, a substantially fluid-tight seal with said socket member, said first tubular end segment of said plug member stopping short of the narrow end of said tapered passage of said socket member when said plug member is disposed in said socket member in said first position, the end of the first tubular end segment of the plug member and the narrow end of the tapered passage of the socket member defining a space into which the plug member can be moved into said second position after portions of the lining have worn.

4. The coupling device as defined in claim 1 wherein said lining is disposed on said plug member.

5. The coupling device as defined in claim 1 wherein said lining is disposed in said socket member.

6. The coupling device in accordance with claim 1, wherein separate linings are disposed on said plug member and in said socket member.

7. The coupling device in accordance with claim 3, wherein said tapered passage of said socket member includes a wear-resistant lining which contacts the outer surface of said first tubular end segment of said plug member when said plug member is seated in said tapered passage of said socket member.

8. The coupling device in accordance with claim 3, wherein said second end portion of said socket member includes attaching means for attaching said socket member to a conduit.

9. The coupling device in accordance with claim 3, wherein said second end segment of said plug member includes attaching means for attaching said plug member to a conduit.

10. The coupling device in accordance with claim 3, wherein said plug member is adapted to be moved deeper into said tapered passage of said socket member as the first tubular end segment and the wear-resistant lining wear, so that said lining continues to contact the conical-like member and the walls of said tapered passage of said socket member to continue to form a substantially fluid-tight seal between said socket member and plug member.

11. The coupling device in accordance with claim 1, wherein said securing means comprises at least a pair of connecting rods each of which is pivotally connected to said body portion of said socket member, each rod being comprised of a first end portion, a second end portion which includes hook-like members for attaching said connecting rod to said securing means of said plug member, and an intermediate portion which includes attaching means, and said coupling device further includes resilient support means which surrounds said body portion of said socket member, said resilient support means being secured to said attaching means of said connecting rods to thereby maintain said connecting rods in engagement with said securing means of said plug member.

12. The coupling device in accordance with claim 3, wherein said securing means of said plug member comprises a plurality of teeth extending from said plug member; said teeth being disposed one behind the other, extending from said second end segment toward said tapered segment of said plug member.

13. The coupling device in accordance with claim 1, wherein at least one connecting rod comprises a plurality of connecting rods and said socket member further includes rod moving means for engaging or disengaging said connecting rods from said securing means of said plug member.

14. The coupling device in accordance with claim 13, wherein said means for engaging or disengaging said connecting rods comprises a ring member disposed about said body portion of said socket member beneath said connecting rods, so that when said ring member is moved toward the second end of said socket member, said ring forces said connecting rods out from engagement with said securing means of said plug member.

* * * * *